United States Patent
Hiraiwa et al.

(10) Patent No.: US 7,254,684 B2
(45) Date of Patent: Aug. 7, 2007

(54) DATA DUPLICATION CONTROL METHOD

(75) Inventors: Yuri Hiraiwa, Sagamihara (JP); Taro Inoue, Yamato (JP); Sumio Goto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 10/801,718

(22) Filed: Mar. 17, 2004

(65) Prior Publication Data

US 2005/0138309 A1 Jun. 23, 2005

(30) Foreign Application Priority Data

Dec. 19, 2003 (JP) .............................. 2003-423464

(51) Int. Cl.
*G06F 12/00* (2006.01)

(52) U.S. Cl. .................. 711/162; 711/154; 711/161; 711/165; 714/6; 714/7; 714/710; 707/201; 707/203; 707/204

(58) Field of Classification Search ................ 711/162, 711/154, 161, 170, 171, 173, 165; 714/6, 714/7, 710; 707/201, 203, 204
See application file for complete search history.

(56) References Cited

U.S. PATENT DOCUMENTS

| | | | |
|---|---|---|---|
| 6,363,502 B1 * | 3/2002 | Jeddeloh ....................... 714/52 |
| 6,507,883 B1 | 1/2003 | Bello et al. .................... 711/4 |
| 6,886,019 B1 | 4/2005 | Cannon et al. ............. 707/204 |
| 2002/0078178 A1 * | 6/2002 | Senoh ......................... 709/219 |
| 2003/0196052 A1 | 10/2003 | Bolik et al. .................. 711/162 |
| 2003/0200275 A1 * | 10/2003 | Hirabayashi et al. ........ 709/214 |
| 2004/0039890 A1 * | 2/2004 | Itoh et al. .................... 711/162 |
| 2004/0046803 A1 | 3/2004 | James ......................... 715/810 |
| 2004/0107325 A1 | 6/2004 | Mori ........................... 711/162 |
| 2004/0133611 A1 | 7/2004 | Cabrera et al. ............. 707/203 |
| 2004/0205310 A1 | 10/2004 | Yamagami ................... 711/162 |
| 2004/0220975 A1 * | 11/2004 | Carpentier et al. ......... 707/200 |
| 2004/0243776 A1 | 12/2004 | Matsui et al. ............... 711/162 |
| 2005/0010733 A1 * | 1/2005 | Mimatsu et al. ............ 711/162 |
| 2005/0076070 A1 | 4/2005 | Mikami ...................... 707/204 |

FOREIGN PATENT DOCUMENTS

| | | |
|---|---|---|
| JP | 2001-318833 | 11/2001 |
| JP | 2003-122509 | 4/2003 |

* cited by examiner

*Primary Examiner*—Stephen C. Elmore
*Assistant Examiner*—Daniel Kim
(74) *Attorney, Agent, or Firm*—Mattingly, Stanger, Malur & Brundidge, P.C.

(57) ABSTRACT

When there is a change in a group of volumes managed by a host computer, data duplication processing is immediately carried out against the changed volume. The host computer includes a volume-managing portion, a data duplication-controlling portion which executes the data duplication of data stored in a volume in a main data center, and a data duplication storing portion which stores data necessary for the data duplication. The data duplication-controlling portion compares data held by the volume-managing portion with the data in the data duplication storing portion, and updates the data in the data duplication storing portion based on the data held by the volume-managing portion.

10 Claims, 10 Drawing Sheets

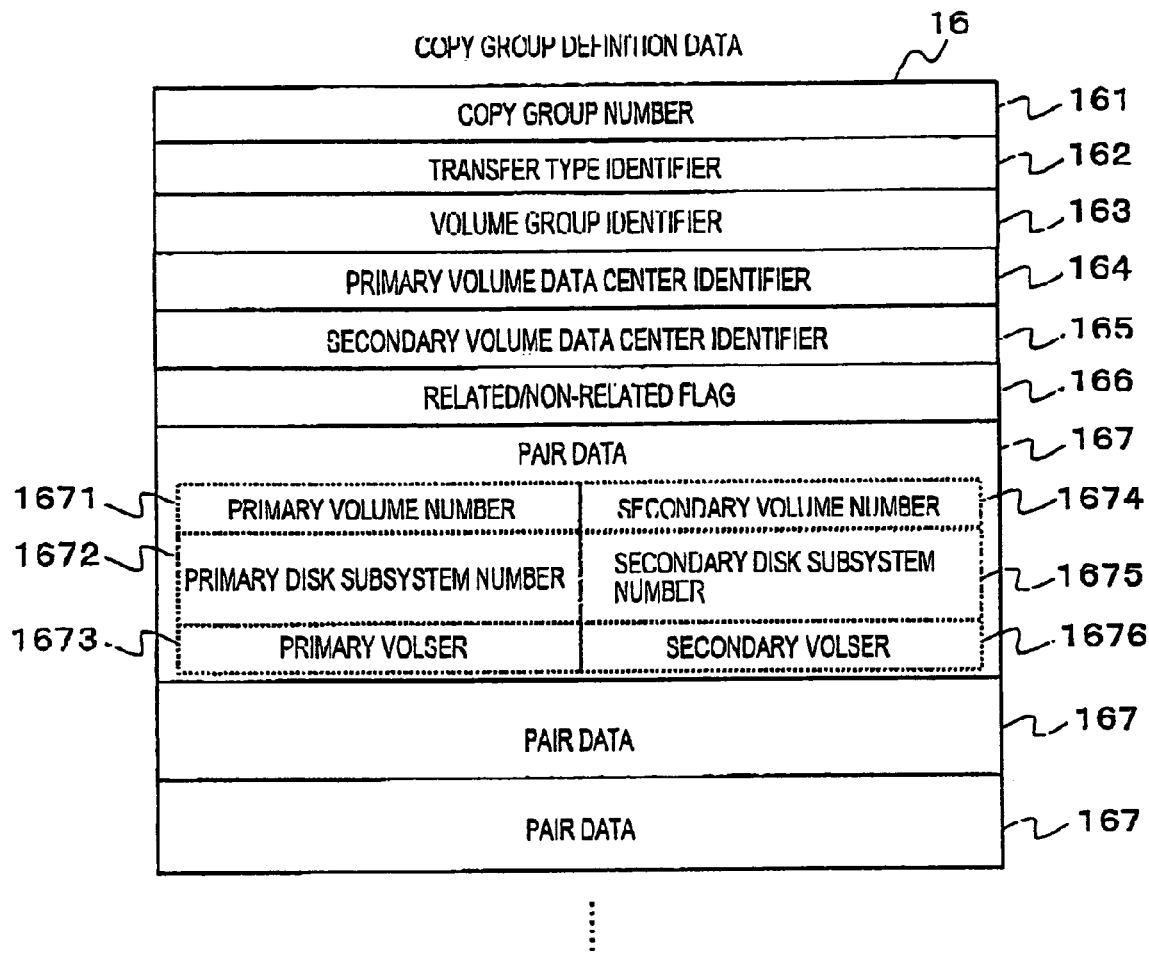

FIG.6

DUPLICATION CONDITION DATA 18

| | SELECTION CONDITION | TEMPORARY CONDITION FLAG |
|---|---|---|
| 183 | IN THE CASE OF ASYNCHRONOUS REMOTE COPY, THE PRIMARY VOLUME IS TO BE WITHIN A SAME DISK SUBSYSTEM. | "OFF" |
| 184 | IN THE CASE OF ASYNCHRONOUS REMOTE COPY, THE SECONDARY VOLUME IS TO BE WITHIN A SAME DISK SUBSYSTEM | "OFF" |
| 185 | THE DISK SUBSYSTEM NUMBER "5" WITH THE DATA CENTER IDENTIFIER BEING "LOCAL" CANNOT BE SELECTED | "ON" |

FIG.7

DISK SUBSYSTEM CONFIGURATION DATA 19

| | | |
|---|---|---|
| 191 | DATA CENTER IDENTIFIER " MAIN " | |
| 192 | DISK SUBSYSTEM NUMBER " 1 " | UNUSED VOLUME NUMBER " 0 " — 193 |
| 194 | VOLUME NUMBER "00" | VOLSER " VOL010 " — 195 |
| | VOLUME NUMBER "01" | VOLSER " VOL001 " |
| | VOLUME NUMBER "02" | VOLSER " VOL005 " |
| 192 | DISK SUBSYSTEM NUMBER " 2 " | UNUSED VOLUME NUMBER " 1 " — 193 |
| 194 | VOLUME NUMBER "00" | VOLSER " VOL003 " — 195 |
| | VOLUME NUMBER "01" | VOLSER " VOL004 " |
| 191 | DATA CENTER IDENTIFIER " LOCAL " | |
| 192 | DISK SUBSYSTEM NUMBER " 5 " | UNUSED VOLUME NUMBER " 0 " — 193 |
| 194 | VOLUME NUMBER "00" | VOLSER " " — 195 |
| | ⋮ | |
| 191 | DATA CENTER IDENTIFIER " REMOTE " | |
| 192 | DISK SUBSYSTEM NUMBER " 8 " | UNUSED VOLUME NUMBER " 1 " — 193 |
| 194 | VOLUME NUMBER "00" | VOLSER " " — 195 |
| | ⋮ | |

DATA DUPLICATION CONTROL METHOD

BACKGROUND OF THE INVENTION

The present invention relates to a technique of data duplication control in a computer system.

It is a matter of course that as for a public or corporate infrastructure system, being responsible for social infrastructure, a high availability is pursued. In particular, nowadays, it is necessary to devise a countermeasure as to recovery works (disaster recovery) of the system after the event of disaster. In this regard, data stored in a main data center (site) is copied in a storage device at a sub data center as data backup. With this configuration, it is possible to continue operations even in disaster situations, by use of the data copied in the storage at the sub data center.

For example, Japanese Patent Laid-open Publication No. 2001-318833 (hereinafter, referred to as "Patent Document 1") discloses a storage subsystem having a volume copying function to copy data by volume. Here, the "volume" indicates a logical unit to manage a storage medium (for example, a magnetic disk and the like) for storing data.

In Japanese Patent Laid-open Publication No. 2003-122509 (hereinafter, referred to as "Patent Document 2") there is disclosed a disaster recovery system which performs data transfer among three data centers. This disaster discovery system holds data in each of the three data centers, thereby reducing data loss, as well as it maintains a configuration being prepared for disaster recovery, even after one data center is lost in the event of a disaster. Here, the "data loss" indicates that if a transfer delay occurs due to a long distance between the data centers and a disaster occurs during the delay time, data that is to be transferred during that time will be lost.

SUMMARY OF THE INVENTION

Usually, data duplication is carried out by selecting a volume where the data that is required to be duplicated is stored, and by copying the data in units of volume. Therefore, a host computer responsible for business processing holds information of a volume which stores important information in the business processing, i.e., a volume required to be duplicated.

When a volume to be used is added due to increase of data for executing business processing, it is also necessary to duplicate thus added volume. In order to keep consistency between data, the copying sequence should be assured when data is copied. Therefore, it is required that the volume newly added is immediately duplicated. However, in a conventional system, timing for such volume addition has not been taken into account.

Furthermore, in the Patent Document 1, there is described that a secondary volume as a data copying destination is allocated (selected) within one disk subsystem. However, there is no consideration regarding a case that which subsystem is to be selected if multiple disk subsystems exist. Further in the Patent Document 1, the data duplication within a multistage data center configuration (among at least three data centers) as described in the Patent Document 2 is not considered either.

The present invention has been made in view of the above situations, and a feature of the present invention is as the following: if there is a change in a group of volumes that are managed by a host computer, data duplication processing is immediately executed against the volume having been changed.

In order to solve the above problems, in the present invention, volume information managed by the host computer and duplication definition information for carrying out the data duplication are compared, and the duplication definition information is updated based on a result of the comparison.

For example, the present invention comprises, an identification information reading step which reads out from a storing portion(unit) an identification information list in which identification information of each of a plurality of storage media included in the storage subsystem is stored, a first reading step which reads out from the storing portion a first duplication definition information which stores the identification information with respect to each of the plurality of storage media, and identification information of a copy destination storage medium of each of the plurality of storage media, and a first comparing step which compares the identification information list read out in the identification information reading step, and the first duplication definition information read out in the first reading step.

The present invention further comprises, an addition step in which if there exists identification information that is stored in the identification information list but not stored in the first duplication definition information in the first comparing step, a copy destination recording medium of the storage medium having the identification information is selected according to a predetermined selection condition, the identification information and the identification information of the copy destination storage medium thus selected are added to the first duplication definition information, and data in the storage medium having the identification information is copied to the copy destination storage medium thus selected, and a deletion step in which if there exists identification information that is not stored in the identification information list but is stored in the first duplication definition information in the first comparing step, the identification information and the identification information of the storage medium, which is a copy destination of the storage medium having the identification information, are deleted from the first duplication definition information, and copying the data of the storage medium having the identification information is stopped.

According to the present invention, if there is a change in a group of volumes that are managed by the host computer, data duplication processing is immediately executed against the volume having been changed.

BRIEF DESCRIPTION OF DRAWINGS

FIG. 4 is a diagram showing an example of data structure of copy group definition data.

FIG. 5 is a diagram showing an example of data structure of copy group relation definition data.

FIG. 6 is a diagram showing an example of data structure of duplication condition data.

FIG. 7 is a diagram showing an example of data structure of disk subsystem configuration data.

DETAILED DESCRIPTION OF THE PREFERRED EMBODIMENTS

Preferred embodiments of the present invention will be explained as the following.

In the data duplication processing of the present embodiment, a volume or copy source is referred to as "a primary volume", and a volume of copy destination is referred to as "a secondary volume". A pair of the "primary volume and the "secondary volume" is referred to as "a pair". Here, it is assumed that in the data duplication processing, there are a synchronous remote copy and an asynchronous remote copy as described in the Patent Document 2. Specifically, the synchronous remote copy is a method as the following: When an update instruction (writing instruction) is issued to the primary volume from a host computer and the like, copying to the secondary volume is continuously carried out in sync with the update instruction. On the other hand, the asynchronous remote copy is as the following: When an update instruction (writing instruction) is issued to the primary volume from a host computer and the like, copying to the secondary volume is carried out at irregular intervals irrespective of the update instruction.

As for a method for selecting a secondary volume within a predetermined disk subsystem, the method described in the patent document 1 will be used. That is, according to a secondary volume selection instruction from the host computer, the disk subsystem selects a volume, not in use and having larger disk volume than that of the primary volume, within the disk subsystem, and notifies the host computer of thus selected volume.

Figure 1:
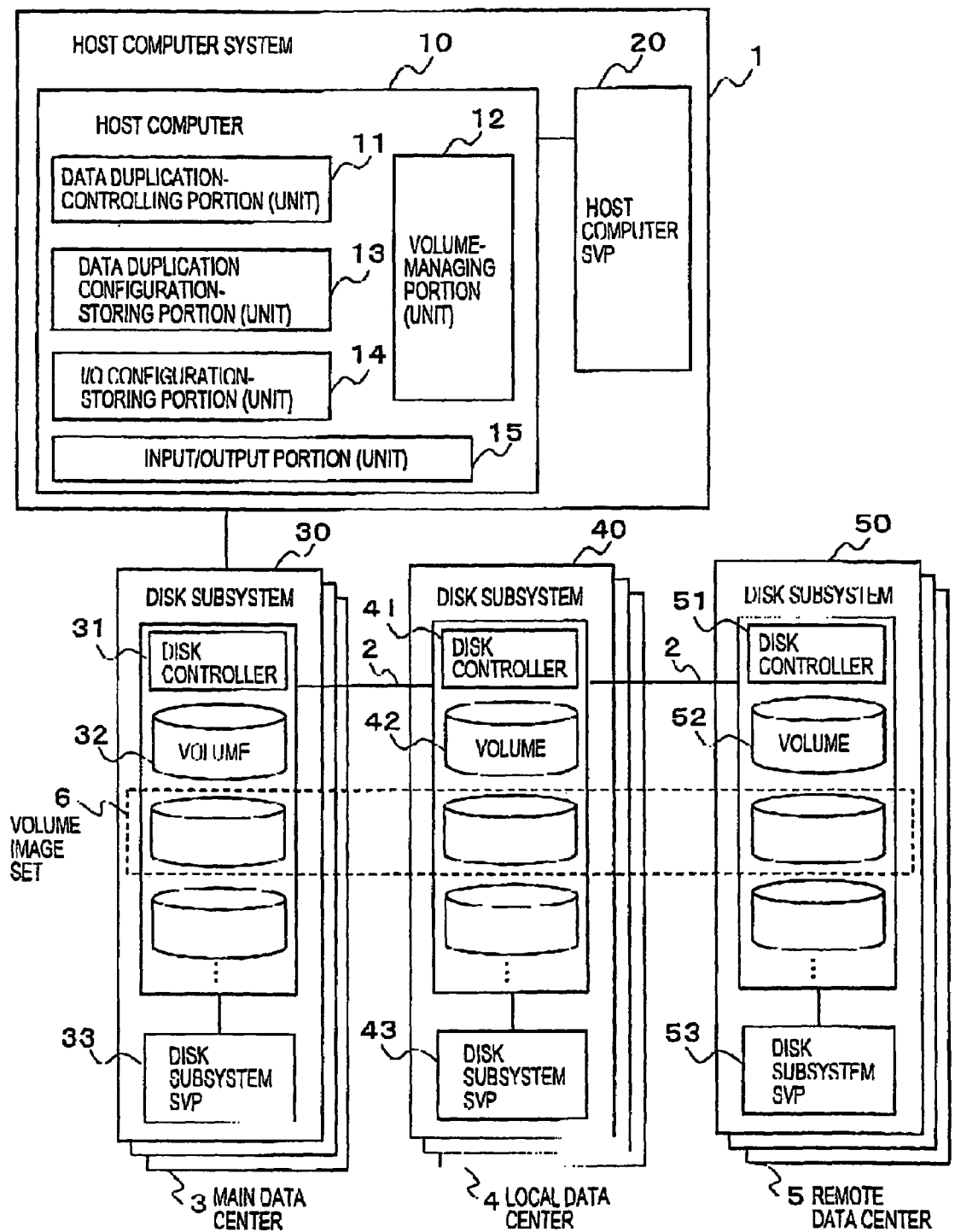
FIG. 1 is a schematic diagram showing a computer system to which one of the embodiments of the present invention is applied.

FIG. 1 is a schematic diagram of a computer system to which one embodiment of the present invention has been applied. This system comprises a host computer system 1, disk subsystem 30 of a main data center 3, a disk subsystem 40 of a local data center 4, and a disk subsystem 50 of a remote data center 5. The main data center 3, the local data center 4, and the remote data center 5 respectively include a plurality of disk subsystems 30, disk subsystems 40, and disk subsystems 50.

Here, it is assumed that the data duplication processing between the main data center 3 and the local data center 4 is based on the synchronous remote copy, and the data duplication processing between the local data center 4 and the remote data center 5 is based on the asynchronous remote copy. It is further assumed that each of the connection between the main data center 3 and the local data center 4, and the connection between the local data center 4 and the remote data center 5 is established via a network 2 such as intranet.

In the present embodiment, as for these data centers 3 to 5, each of the disk subsystems 30, 40 and 50, respectively of the main data center 3, the local data center 4, and the remote data center 5 are serially connected, setting the host computer system 1 as a base point. In other words, firstly, the volume 32 of the main data center 3 is defined as a primary volume that is a copy source, and the volume 42 of the local data center 4 is defined as a secondary volume, so that those two volumes are defined as a first pair. Furthermore, the volume 42 of the local data center 4 is defined as a primary volume and the volume 52 of the remote data center 5 is defined as a secondary volume, so that those two volumes are defined as a second pair. With this configuration, it is possible to make a copy of the volume 32 of the main data center 3 in the remote data center 5.

It is to be noted that each of the volumes in the first pair where the volume 32 of the main data center 3 is defined as a primary volume and the second pair where the volume 42 of the local data center 4 is defined as a primary volume, are collectively referred to as a volume image set 6.

In the present embodiment, the data centers are in three stages, i.e., the main data center 3, the local data center 4 and the remote data center 5. However, the present invention is not limited to this configuration, and data centers in two stages or four or more stages may be applicable.

The host computer system 1 comprises a host computer 10 and a host computer SVP (Service Processor) 20. The host computer 10 is a general-purpose computer unit which executes various data processing procedures (so-called business processing). The host computer 10 comprises a data duplication-controlling portion(unit) 11, a volume-managing portion(unit) 12, a data duplication configuration-storing portion(unit) 13, an I/O configuration-storing portion(unit) 14, and an input-output portion(unit) 15.

The data duplication-controlling portion 11 controls so-called data duplication processing, in which a copy is made by volume as to the data stored in the disk subsystem 30 of the main data center 3, to the disk subsystems 40, 50 of the local data center 4 and the remote data center 5.

The volume-managing portion 12 serves as a function of the operating system (referred to as "OS" in the following), which is not illustrated, and provides an application program (business processing program) with the volumes in the disk subsystems collectively as one virtual volume group. Furthermore, the volume-managing portion 12 manages this virtual volume group, and outputs management information of the volumes (for example, a list of VOLSER) included in the volume group. The "VOLSER" represents "volume serial number" that is allocated to identify individual volumes. It is assumed in the present embodiment that the volume-managing portion 12 has one volume group.

The data duplication configuration-storing portion 13 stores information necessary for the data duplication-controlling portion 11 to execute the data duplication processing, and this will be explained below with reference to FIG. 3 to FIG. 7.

The I/O configuration-storing portion 14 stores configuration information of various I/O devices including the disk subsystems connected to the host computer 10. When the host computer 10 is started up, the OS expands on a memory (main memory) the information stored in the I/O configuration-storing portion 14.

The input-output portion 15 carries out data transfer between the various I/O devices including the disk subsystem and the memory, based on the information stored in the I/O configuration-storing portion 14. The CPU in the host computer 10 accesses the disk subsystem via the input-output portion 15, and refers to and updates data. The host computer SVP 20 is a sub processor to monitor or operate the host computer 10, and it is used as a console.

The main data center 3 comprises a plurality of subsystems 30 which are connected to the host computer 10. Each of the disk subsystems 30 includes a disk controller 31, a plurality of volumes 32, and a disk subsystem SVP 33. The disk controller 31 controls the volume 32, such as data input and output, based on an instruction from the host computer 10. It is to be noted that the disk controller 31 also executes a process for selecting a secondary volume as described in the Patent Document 1. In other words, according to the instruction from the host computer 10 to select a secondary volume, the disk controller 31 selects a volume within the disk subsystem, not in use and having larger disk volume than that of the primary volume, and notifies the host computer of thus selected volume.

The volume 32 is storage medium for storing data, such as magnetic disk, and it is a logical unit to manage the storage medium. Therefore, a plurality of physical magnetic disks may be stored in one volume 32, or it is possible to define a plurality of magnetic disks as one volume. The disk subsystem SVP 33 is a sub processor to monitor or operate the disk controller 31 and a plurality of volumes 32.

The local data center 4 and the remote data center 5 respectively have a plurality of disk subsystems 40, 50. The plurality of disk subsystems 40, 50 have similar configuration as that of the disk subsystems 30 in the main data center 3.

Figure 2:
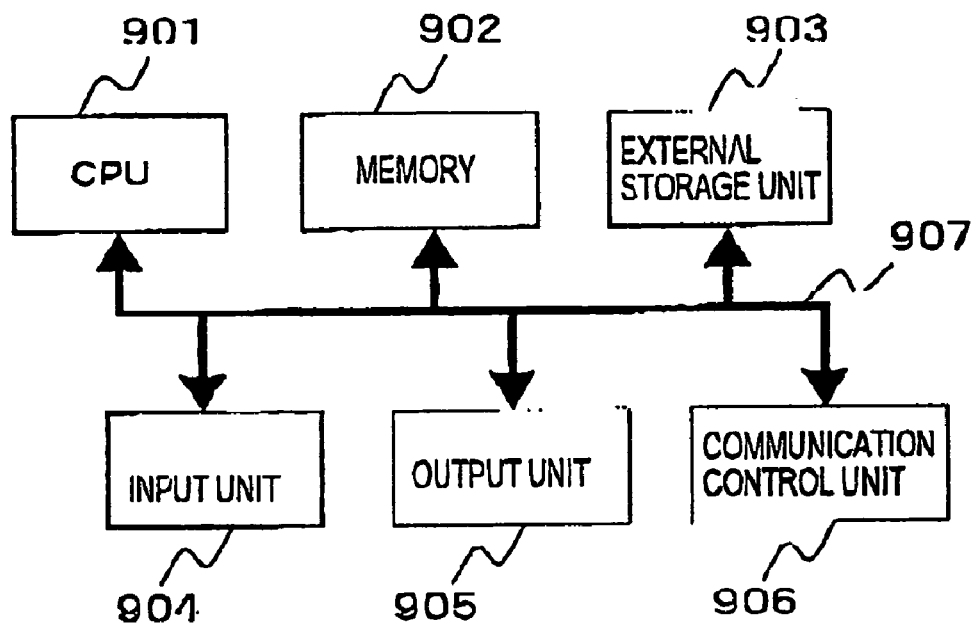
FIG. 2 is a diagram showing an example of a hardware configuration of the computer system.

As the host computer 10 described above, it is possible to use a general-purpose computer system which comprises, as shown in FIG. 2 for example, a CPU 901, a memory 902, an external storage unit 903 such as magnetic disk, an input unit 904 such as a keyboard and mouse, an output unit 905 such as a monitor and printer, a communication control unit 906 to establish a connection with a network, and a bus 907 for connecting the each of the above units.

In this computer system, when the CPU 901 executes a predefined program of the host computer 10, which is loaded on the memory 902, each function of the host computer 10 is implemented. In this case, the memory 902 or the external storage unit 903 is utilized as the data duplication configuration-storing portion 13 and the I/O configuration-storing portion 14. The disk subsystem 30 of the main data center 3 is also used as the external storage unit 903. The host computer SVP 20 is utilized as the input unit 904 or output unit 905.

It is to be noted that a general-purpose computer system as shown in FIG. 2 can also be used for the host computer SVP 20, the disk subsystem SVPs 33, 43, 53 and the disk controllers 31, 41, 51.

Next, the data duplication configuration-storing portion 13 of host computer 10 will be explained.

Figure 3:
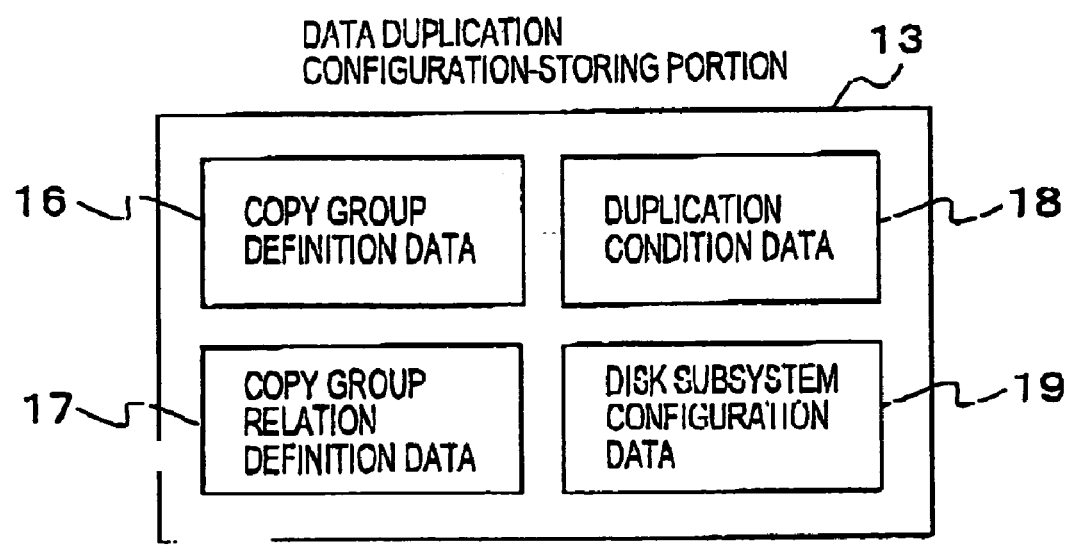
FIG. 3 is a diagram showing an example of data structure of data duplication configuration-storing portion(unit).

FIG. 3 shows information items stored in the data duplication configuration-storing portion 13. The data duplication configuration-storing portion 13 comprises copy group definition data 16, copy group relation definition data 17, duplication condition data 18 and disk subsystem configuration data 19.

FIG. 4 shows an example of data structure of the copy group definition data 16. The "copy group" represents a collection of pairs of the primary volume (copy source) and the secondary volume (copy destination) in the data duplication processing. In the present embodiment, there are generated two copy groups, i.e., a copy group between the main data center 3 and the local data center 4, and a copy group between the local data center 4 and the remote data center 5. If another copy group exists as a target of the data duplication processing, such as the case where the data duplication is carried out in a data center besides the above three data centers, the copy group definition data 16 is further generated for the additional copy group.

The copy group definition data 16 includes a copy group number 161, a transfer type identifier 162, a volume group identifier 163, a primary volume data center identifier 164, a secondary volume data center identifier 165, a related/non-related flag 166, and at least one pair data 167.

The copy group number 161 is a number to identify a copy group. The copy group number 161 may be a unique number inputted by a user from the input unit 904. Alternatively, it may be a number obtained by automatic numbering by the data duplication-controlling portion 11. The transfer type identifier 162 is to identify the transfer type, synchronous or asynchronous. The volume group identifier 163 is to identify a virtual volume group managed by the volume-managing portion 12.

The primary volume data center identifier 164 is to identify the data center, in which the primary volume (copy source) of the pair included in the copy group exists. The secondary volume data center identifier 165 is to identify the data center in which the secondary volume (copy destination) of the pair included in the copy group exists. It is to be noted as the data center identifiers 164, 165, for example, the main data center 3 may be represented by "main", the local data center 4 may be represented by "local", and the remote data center 5 may be represented by "remote". The related/non-related flag 166 is a flag which indicates whether or not a copy group exists, which defines the secondary volume of the pair included in the copy group as a primary volume. That is, it is a flag to identify an existence of a copy group which forms a volume image set 6 together with the present copy group.

The pair data 167 is to identify a primary volume (copy source) and a secondary volume (copy destination) which constitute a pair, and the pair data is configured by pairings the primary volume and the secondary volume. Furthermore, if there are a plurality of pairs within one copy group, a plurality of pair data items 167 are made corresponding to the number of pairs existing in the copy group.

In other words, as shown in FIG. 4, the pair data 167 comprises as information of the primary volume (copy source), a primary volume number 1671, a primary disk subsystem number 1672, and a primary VOLSER 1673. Similarly, the pair data 167 as information of the secondary volume (copy destination), a secondary volume number 1674, a secondary disk subsystem number 1675, and a secondary VOLSER 1676.

The volume numbers (primary and secondary) 1671, 1674 are unique numbers which identify the volumes uniquely within the disk subsystem. Furthermore, the disk subsystem numbers (primary and secondary) 1672, 1675 are unique numbers which identity uniquely a plurality of disk subsystems existing in the data center. The VOLSERs (primary and secondary) 1673, 1676 are serial volume numbers for the volume-managing portion 12 of the host computer 10 to manage each volume. It is to be noted that the volumes 42, 52 of the local data center 4 and the remote data center 5 may not be managed by the volume-managing portion 12. In this case, the VOLSERs 1673, 1676 of the volumes 42, 52 respectively included in the local data center 4 and the remote data center 5 become space (empty data).

Next, the copy group relation definition data 17 will be explained. The copy group relation definition data 17 establishes relations among a plurality of copy groups that are defined in the copy group definition data 16. Accordingly, the volume image set 6 can be defined.

FIG. 5 shows an example of data structure of the copy group relation definition data 17. The copy group relation definition data 17 comprises the first copy group number 171 and the second copy group number 172. In the first copy group number 171, there is stored a copy group number 161 of the copy group definition data 16 where an identifier of the main data center 3 is stored in the primary volume data center identifier 164. In the second copy group number 172, there is stored another copy group number 161 of the copy group definition data 16. The copy group definition data 16 indicated by the another copy group number includes identification information items 1671 to 1673 regarding the primary volume (copy source) stored in each pair data 167, which respectively correspond to identification information items 1674 to 1676 regarding the secondary volume (copy destination) stored in each pair data 167 of the copy group definition data 16, the copy group number of which is stored in the first copy group number 171.

In other words, the secondary volume information items 1674 to 1676 of each pair data 167 included in the copy group definition data 16 of the first copy group number 171 are respectively equal to the primary volume information items 1671 to 1673 of each pair data 167 included in the copy group definition data 16 having the second copy group number 172. As thus described, related copy group number 161 is stored in each of the first copy group number 171 and the second copy group number 172, whereby a volume image set 6 can be defined by establishing a relation between two copy groups.

In the present embodiment, since the data centers are in three stages, the copy group relation definition data 17 includes the first and the second copy group numbers 171, 172. However, if the data centers are in four stages, the copy group relation definition data 17 may further include a third copy group number in addition to the first and the second copy group numbers 171, 172.

Next, the duplication condition data 18 will be explained. The duplication condition data 18 stores a condition for selecting a disk subsystem of the copy destination or the copy source, when a pair is made (i.e., a pair is made between the primary volume of copy source and the secondary volume of copy destination). It is to be noted that the duplication condition data 18 is used in volume addition processing (see FIG. 9) in the data duplication-controlling portion 11, as described below.

FIG. 6 shows an example of table which represents the duplication condition data 18. The duplication condition data 18 comprises a selection condition 181, in which a selection condition used when the data duplication-controlling portion 11 selects a disk subsystem is described, and a temporary condition flag 182 which indicates whether or not the selection condition 181 is temporarily used only in the present volume addition processing.

The selection condition 181 includes two types, i.e., a permanent (general) selection conditions 103, 184, which are previously inputted by a user from the input unit 904, and a temporary selection condition 185 temporarily generated by the data duplication-controlling portion 11 in the volume addition processing. The permanent selection conditions 183, 184 include a condition necessary for volume management and operations, a restriction in a hardware specification or a restriction in the data duplication-controlling portion 11, and the conditions are to be used in all volume addition processing. For example, among the selection conditions as shown in FIG. 6, in the permanent selection conditions 183, 184, there are described selection conditions in the case of asynchronous remote copy (data duplication between the local center 4 and the remote data center 5). As for the temporary selection condition 185, it is generated when the data duplication-controlling portion 11 executes the volume addition processing, and it is a selection condition used only in the present processing. This temporary selection condition is deleted at the time when the present processing is completed.

The temporary condition flag 182 is a flag to identify whether the selection 181 is permanent or temporary. In the present embodiment, the temporary condition flag 102 being "OFF" indicates permanent selection conditions 183, 184. Alternatively, the temporary condition flag 182 being "ON" indicates a temporary selection condition 185.

Next, the disk subsystem configuration data 19 will be explained. The disk subsystem configuration data 19 stores a configuration of the disk subsystem and volume which are target of data duplication processing in the host computer 10.

FIG. 7 shows an example of data structure of the disk subsystem configuration data 19. As illustrated, the disk subsystem configuration data 19 stores by data center, a data center identifier 191, a disk subsystem number 192, an unused volume number 193, a volume number 194, and VOLSER 195. The unused volume number 193 stores the number or volumes which are unused (blank) within the disk subsystem. This unused volume number 193 initially stores the number of all volumes included in the disk subsystem. When the data duplication-controlling portion 11 uses the unused volume, for the volume addition processing and the like (see FIG. 9), the number of volumes thus used is subtracted form the unused volume number 193. In other words, the disk subsystem where the unused volume number 193 is "0", it indicates that there is no unused volume.

In the example as shown in FIG. 7, the main data center 3 whose data center identifier 191 is "main" includes two disk subsystems, the disk subsystem numbers 192 of which are respectively "1" and "2". The disk subsystem whose disk subsystem number 192 is "1" includes three volumes the volume numbers 194 of which are "00", "01", and "02", respectively. The VOLSER 195 of each volume is "VOL010", "VOL001", and "VOL005". Since the unused volume 193 is "0", there is no volume that is unused, as for those volumes.

Furthermore, the local data center 4 whose data center identifier 191 is "local" includes a disk subsystem having "5" as the disk subsystem number 192, and this disk subsystem includes a volume whose volume number 194 is "00". Since this volume is not managed by the volume-managing portion 12, the VOLSER 195 is blank (space). Furthermore, the remote data center 5 whose data center identifier 191 is "remote" includes a disk subsystem whose disk subsystem number 192 is "8", and this disk subsystem includes a volume whose volume number 194 is "00". The VOLSER 195 of this volume is also blank (space).

Figure 8:
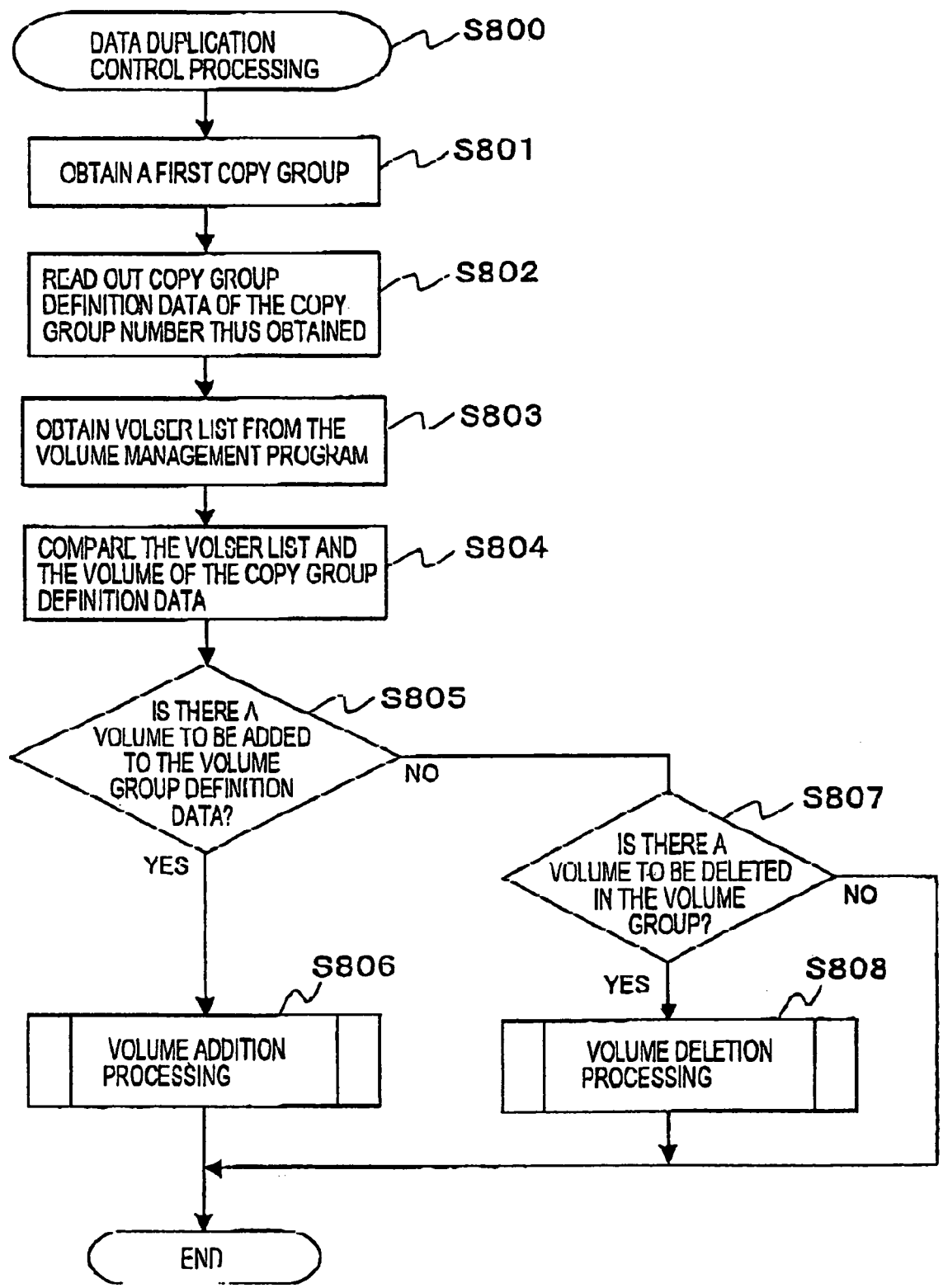
FIG. 8 is a diagram showing a flowchart of processing in the data duplication-controlling portion(unit).

Next, a flow of processing in the data duplication-controlling portion 11 will be explained following the flowchart as shown in FIG. 8.

The data duplication-controlling portion 11 executes the data duplication processing periodically, every constant time period or cycle (for example, once a day, once a week, and the like). Alternatively, the data duplication-controlling portion 11 receives a user instruction from the input unit 904, and executes the data duplication processing. When there is a change in a volume group managed by the volume-managing portion 12, the volume-managing portion 12 instructs the data duplication-controlling portion 11 to execute the data duplication processing. Then, the data duplication-controlling portion 11 receives this execution instruction, and executes the data duplication processing.

firstly, the data duplication-controlling portion 11 reads out the copy group relation definition data 17 from the data duplication configuration-storing portion 13, and obtains the first copy group number 171 (S801). Then, the data duplication-controlling portion 11 reads out from the data duplication configuration-storing portion 13, the copy group definition data 16 having the copy group number thus obtained, and further obtains a volume group identifier 163 of the copy group definition data 16 thus road out (S802).

Next, the data duplication-controlling portion 11 obtains from the volume-managing portion 12, a VOLSER list of the volume group identifier 163 thus obtained (S803). The VOLSER list is a list which the volume-managing portion 12 holds by volume group, and it is a catalogue of VOLSERs of the volumes included in each volume group.

Then, the data duplication-controlling portion 11 compares the VOLSER registered in the VOLSER list obtained in S803, and primary VOLSER 1673 of each pair data 167 included in the copy group definition data 16 which is read out in S802 (S804). Then, the data duplication-controlling portion 11 determines whether or not there exists a volume as to which the data volume addition processing is to be executed (S805). In other words, the data duplication-controlling portion 11 determines whether or not all the VOLSERs stored in the VOLSER list are stored in the primary VOLSER 1673 of the pair data 167.

If there is a VOLSER that is included in the VOLSER list, but not stored in any of the primary VOLSER 1673 of the pair data 167 (S805: YES), it indicates that a volume to be used in the business processing in the host computer 10 is added, but a data duplication processing has not been carried out yet against thus added volume. Therefore, the data duplication-controlling portion 11 executes a process for adding a volume of the pertinent VOLSER to the copy group definition data 16 (S806). This volume addition processing (S806) will be described below with reference to FIG. 9.

On the other hand, all the VOLSERs included in the VOLSER list are respectively stored in any of the primary VOLSER 1673 of the pair data 167 (S805: NO), the data duplication-controlling portion 11 determines whether or not there is a volume to be deleted from the copy group definition data 16 (S807) In other words, if there is a VOLSER which is stored in the primary VOLSER 1673 of the pair data 167, and not stored in the VOLSER list (S807: YES), it indicates that the data duplication processing is performed against a volume which becomes unnecessary in the business processing. Therefore, the data duplication-controlling portion 11 carries out a process for deleting the pair data 167 having the volume of the pertinent VOLSER, from the copy group definition data 16 (S808). This volume deletion processing (S808) will be described with reference to FIG. 10.

On the other hand, if all the VOLSERs stored in the primary VOLSER 1673 of the pair data 167 are stored in the VOLSER list (S807: NO), VOLSERs in the VOLSER list and the primary VOLSERs 1673 of the pair data 167 held by the copy group definition data 16 are respectively identical to each other. Therefore, the data duplication-controlling portion 11 completes the data duplication-control processing, without executing the volume addition processing (S806) or the volume deletion processing (S808).

Then, the data duplication-controlling portion 11 is in a state of "WAIT", until the next start-up timing (for example, at the next start-up cycle, upon receipt of execution instruction from a user or the volume-managing portion 12, and the like).

Figure 9:
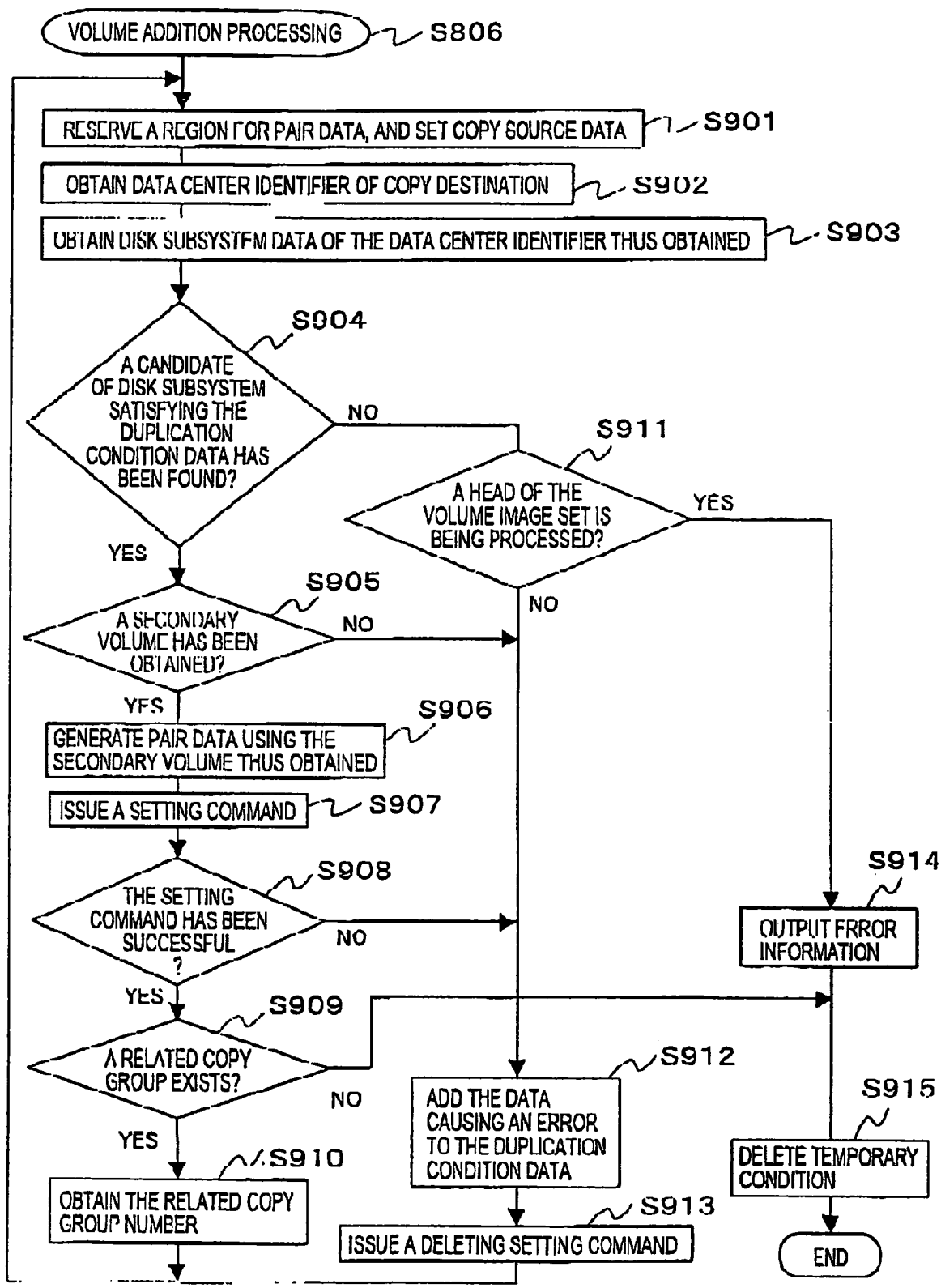
FIG. 9 is a diagram showing a flowchart of volume addition processing in the data duplication-controlling portion(unit).

Next, a flow of the aforementioned volume addition processing (S806) will be explained following the flowchart as shown in FIG. 9.

At first, the data duplication-controlling portion 11 reserves a region in the data duplication configuration-storing portion 13, for adding the pair data 167 in the copy group definition data 16, which is a target for processing. Then, primary volume information (copy source) of thus added pair data 167 is set (S901). In other words, the data duplication-controlling portion 11 sets in the primary VOLSER 1673, a VOLSER that is determined to be added in S806. Then, the data duplication-controlling portion 11 reads out the disk subsystem configuration data 19, and obtains a volume number 194 and a disk subsystem number 192 of the VOLSER thus set. Then, the obtained volume number 194 and the disk subsystem number 192 are respectively set in the primary volume number 1671 and the primary disk subsystem number 1672.

Then, the data duplication-controlling portion 11 obtains from the copy group definition data 16 which is a target of processing, a secondary volume data center identifier 165 as a copy destination (S902). Next, the data duplication-controlling portion 11 reads out the disk subsystem configuration data 19, and obtains the disk subsystem data 192 to 195 held by the data center identifier 191 identical to the data center identifier 165 thus obtained (S903). Then, the data duplication controlling portion 11 determines whether or not there is a disk subsystem available for being selected as a copy destination, based on the obtained disk subsystem information 192 to 195 (S904).

In other words, the data duplication-controlling portion 11 firstly extracts a disk subsystem which has an unused volume. It is determined whether or not there is an unused volume in a disk subsystem, by referring to the value of the unused volume number 193 of the disk subsystem configuration data 19. The disk subsystem having the value other than "0" is extracted, since it indicates that there is an unused volume. If the unused volume number 193 of a disk subsystem is "0", it indicates that the disk subsystem does not include an unused volume, and thus it cannot be selected as a copy destination subsystem.

Then, the data duplication-controlling portion 11 selects a disk subsystem which satisfies a condition described in the selection condition 181 of the duplication condition data 18. For example, in the duplication condition data 18 as shown in FIG. 6, if the transfer type identifier 162 or the copy group definition data 16 as a processing target is synchronous remote copy, any of the constant selection conditions 183 and 184 is not applicable. Therefore, it is possible to select a disk subsystem having an unused volume, without being restricted by the constant selection conditions 183, 184, which are stored in the duplication condition data 18. On the other hand, if the transfer type identifier 162 of the copy group definition data 16 as a processing target is asynchronous remote copy, both of the constant selection conditions 183 and 184 are applicable. Therefore, a disk subsystem which satisfies those constant selection conditions 183, 184 is selected. It is to be noted if there are a plurality or disk subsystem selectable as a copy destination, any one of the disk subsystem numbers is selected, in accordance with a predefined rule, such as selecting a disk subsystem having the smallest disk subsystem number 192.

If there is a disk subsystem as a candidate of the copy destination (S904: YES), the data duplication-controlling portion 11 determines whether or not a secondary volume as a copy destination can he obtained from the pertinent disk subsystem (S905). A method for obtaining the secondary volume is same as the method for selecting a secondary volume described in the Patent Document 1. In other words, according to the instruction for selecting a secondary volume from the data duplication-controlling portion 11, the disk controller 31 selects a volume unused and having a disk volume larger than that of the primary volume, and notifies the data duplication-controlling portion 11 of thus selected volume.

If the secondary volume is normally obtained (S905: YES), the data duplication-controlling portion 11 sets the information of thus obtained secondary volume, in the secondary volume information (copy destination) of the pair data reserved in S901 (S906). In other words, the volume number 1674 and the dial subsystem number 1675 of the pertinent secondary volume is set. Then, the data duplication-controlling portion 11 issues a pair making setting command for the newly generated pair as the pair data 167, to the disk subsystem of the primary volume (copy source) and the disk subsystem of the secondary volume (copy destination) (S907). It is to be noted that this pair making setting command is same as a pair making command for the "pair making" as described in the Patent Document 1. That is, the pair making command triggers off a updating of internal information in the disc subsystem and execution of a copy-making.

Then, the data duplication-controlling portion 11 determines whether or not the setting command has been successful (S908). If the setting command has been successful (S908: YES), the data duplication-controlling portion 11 determines whether or not there exists a copy group related with the copy group definition data 16 as a processing target (S909). Specifically, the data duplicate-controlling portion 11 refers to the related/non-related flag 166 of the copy group definition data 16, and determines whether or not there is a related copy group.

If there exists a related copy group (S909: YES), it indicates that a volume image set 6 is in process of being generated. Specifically, it indicates a status that even after the pair data 167 is defined between the disk subsystem 30 of the main data center 3 and the disk subsystem 40 of the local data center 4, the pair data 167 between the disk subsystem 40 of the local data center 4 and the disk subsystem 50 of the remote data center 5 has not been defined yet. Therefore, it is necessary to execute a volume addition processing continuously.

If there is a related copy group (S909: YES), the data duplication-controlling portion 11 refers to the copy group relation definition data 17, and obtains a second copy group number 172 having as the first copy group number 171, the copy group number 161 of the pertinent copy group (S910). Then, the process returns to S901, and the data duplication-controlling portion 11 carries out the volume addition processing again against the copy group having the second copy group number, which is obtained in S910. In this case, the data duplication-controlling portion 11 sets the volume information of copy destination of the pair data 167 generated in S906, as primary volume information (copy source) of the pair data 167, for which a region is newly reserved.

Furthermore, if there is not a disk subsystem satisfying the duplication condition data 18 and the like (S904: NO), the data duplication-controlling portion 11 determines whether or not the copy group as a processing target is a head of the volume image set 6 (S911). In other words, the data duplication-controlling portion 11 determines whether or not the copy group number 161 of the copy group definition data 16 as a processing target is stored in the second copy group number 172 of the copy group relation definition data 17. If the copy group number 161 as a processing target is stored in the second copy group number 172, the data duplication-controlling portion 11 determines that the pertinent copy group is not a head of the volume image set 6. On the other hand, if the copy group number 161 as a processing target is not stored in the second copy group number 172, the data duplication-controlling portion 11 determines that the pertinent copy group is a head of the volume image set 6.

If the copy group as a processing target is a head of the volume image set 6 (S911: YES), that is, if it is a pair making between the main data center 3 and the local data center 4, the data duplication-controlling portion 11 outputs an error in the host computer SVP 20 which is an output unit 905 (S914).

On the other hand, if the copy group as a processing target is not a head of the volume image set 6 (S911: NO), or a secondary volume cannot be obtained (S905: NO), or a setting command has failed (S908), it is necessary that the process returns to S901, and the volume addition processing (S806) is executed again. Therefore, the data duplication-controlling portion 11 adds the information which is a cause of error to the duplication condition data 18 (S912). In other words, the data duplication-controlling portion 11 adds the information as to the disk subsystem in error to the selection condition 181 of the duplication condition data 18, so that the disk subsystem in error cannot be selected. At that timing, the temporary condition flag 182 is set to "ON". For example, as shown in FIG. 6, a temporary selection condition 185 is added, such as "the disk subsystem number "5" with the data center identifier being "local" cannot be selected".

It is noted that when the setting command has failed (S908), it is conceivable that a failure occurs in the disk subsystem that issued a command. Therefore, the data duplication-controlling portion 11 adds to the duplication condition data 18, the information of the disk subsystem where the failure has occurred, as a temporary selection condition, so that such subsystem cannot be selected.

Furthermore, if the copy group as a processing target is not a head of the volume image 6 (S911: NO), a selection of the disk subsystem in the copy group at the head of the volume image set 6 causes an error. The selection of the disk subsystem in the copy group at the head causes such an error, because of the reasons as the following: As described above, in the example of constant conditions 183, 184 of the duplication condition data 18 (see FIG. 6), conditions in the case of asynchronous transfer are described. Therefore, if the head copy group is based on synchronous transfer, the constant conditions 183, 184 are not applicable. However, if related copy group is based on asynchronous transfer, those constant conditions 183, 184 are applicable. For example, if a different disk subsystem is selected as a secondary volume in the volume addition processing for the head copy group, the selected disk subsystem becomes a primary volume of the related copy group. Therefore, it does not satisfy the constant condition 183.

Then, the data duplication-controlling portion 11 refers to the copy group relation definition data 17, and obtains a first copy group number 171 that has the copy group number 161 of the copy group definition data 16 as a processing target, as a second copy group number 172. Subsequently, the data duplication-controlling portion 11 defines the copy group definition data 16 of thus obtained first copy group number as a copy group to be processed next. Then, the data duplication-controlling portion 11 issues to tho disk subsystem, a pair deleting setting command for deleting the pair making setting command which has been issued against the head copy group in S907 (S913). Furthermore, the data duplication-controlling portion 11 deletes the pair data 167 generated in the volume addition processing in the head copy group. It is to be noted here that this pair deleting setting command is same as the deleting command for "pair deletion" destined in the Patent Document 1. That is, the internal information of the disk subsystem is updated to render the status as "no pair making".

Subsequently, the data duplication-controlling portion 11 returns the process to S901, and the volume addition processing (S806) is executed again for the head copy group.

After error information is outputted due to a failure in the volume addition processing (S914), or the volume addition processing is successful and no other relating copy group exists (S909: NO), the data duplication controlling portion 11 deletes the temporary selection condition 185 with a temporary condition flag 182 "ON", which has bean added to the duplication condition data 18 (S915), and the volume addition processing is completed.

Figure 10:
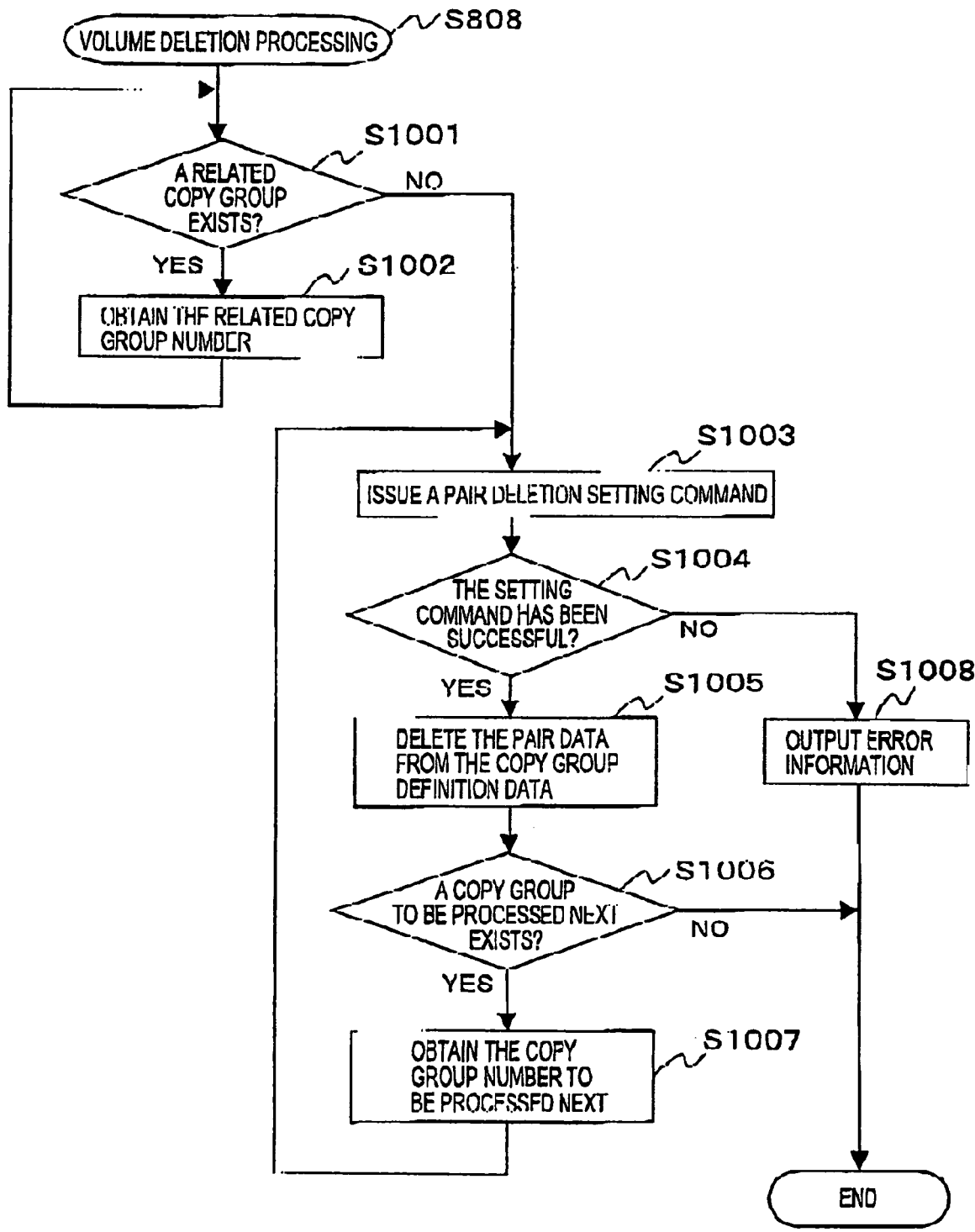
FIG. 10 is a diagram showing a flowchart of volume deletion processing in the data duplication-controlling portion(unit).

Next, a flow of the aforementioned volume deletion processing (S808) will be explained following the flowchart as shown in FIG. 10.

The data duplication-controlling portion 11 determines whether or not the copy group decided to be deleted in S808 has a related copy group, by referring to the related/non-related flag 166 (S1001). Then, if it has a related copy group (S1001: YES), the data duplication-controlling portion 11 obtains a copy group number of the related copy group and pair data 167 as a target of the deletion processing (S1002). In other words, the data duplication-controlling portion 11 refers to the copy group relation definition data 17, and obtains a second copy group number which has the copy group number as a processing target, as the first copy group number 171. Furthermore, the data duplication controlling portion 11 obtains a secondary volume of the volume (primary volume) to be deleted. Then, the data duplication-controlling portion 11 refers to the copy group definition data 16 of thus obtained copy group number, and obtains pair data 167 in which the secondary volume (copy destination) of the primary volume (copy source) to be deleted is defined as a primary volume (copy source).

Then, the data duplication-controlling portion 11 returns the process to S1001, and determines again whether or not the copy group decided to be deleted has a related copy group (S1001). If it does not have a related copy group (S1001: NO), the data duplication-controlling portion 11 issues to the disk subsystem, a pair deleting setting command to delete the pair of the pair data 167 including a volume to be deleted (or a secondary volume (copy destination) of the volume to be deleted) (S1003).

Then, the data duplication-controlling portion 11 determines whether or not the pair deleting setting command has been successful (S1004). When the pair deleting setting command has been successful (S1004: YES), the data duplication-controlling portion 11 deletes from the copy group definition data 16, the pair data 167 as to which the deleting setting command has been issued (S1005). Subsequently, the data duplication-controlling portion 11 determines whether or not there is a copy group to be deleted next (S1006). In other words, when the data duplication-controlling portion 11 obtains a related copy group in S1002, it stores a copy group number and pair data to be deleted at the present timing, in the memory 902 or in the external storage unit 903. Then, the data duplication controlling portion 11 determines whether or not there is a copy group to be deleted next by use of those information items.

If there is a copy group to be deleted next (S1006: YES), the data duplication-controlling portion 11 obtains the copy group number and the pair data 167 stored in S1002 (S1007), and it returns the process to S1003 and issues a pair deleting setting command. Alternatively, if there is no copy group to be deleted (S1006: NO), the volume deletion processing is completed. Furthermore, if the pair deleting setting command failed (S1004: NO), the data duplication-controlling portion 11 outputs an error to the host computer SVP 20 which is an output unit 905, and ends the volume deleting processing.

In the description above, one embodiment of the present invention has been explained.

In the present embodiment, if there is a change in volume group managed by the host computer 10, it is possible to carry out immediately the date duplication processing against thus changed volume. Accordingly, data consistency is secured, whereby consistency of the data within the volume groups can be maintained.

Furthermore, even if there are multiple disk subsystems, an appropriate subsystem can be selected as a copy destination for duplicating data.

In addition, even if the system configuration is complicated due to a plurality of data copy destinations, such as the main data center 3, the local data center 4, and the remote center 5, it is possible to select an appropriate disk system as a copy destination for data duplication, by adding a temporary selection condition to the duplication condition data 18, whereby the data duplication processing can be easily implemented.

It is to be noted that the present invention is not limited to the above embodiment, and various modifications may be possible without departing from the scope of the present invention.

For example, in the embodiment above, there is explained a case that only one volume group is managed by the volume-managing portion 12, and the data within the volume group is duplicated to the main data center 3, the local data center 4 and the remote data center 5. However, it is possible to consider a case where multiple volume groups exist. In this case, multiple copy group relation definition data items 17 are generated, the number of which is equal to that of the existing volume groups.

In the embodiment above, it is defined that the disk subsystem configuration data 19 is previously stored in the data duplication configuration-storing portion 13, prior to executing the data duplication processing. However, it is possible to configure such that each disk subsystem obtains the disk subsystem configuration data 19. That is, the data duplication-controlling portion 11 issues a pair making command between the local data center 4 and the remote data center 5 via the main data center 3. In such a manner, it is possible for the data duplication-controlling portion 11 to obtain the disk subsystem configuration data of the local data center 4 and the remote data center 5 via the main data center 3. Alternatively, without through the main data center 3, the data duplication-controlling portion 11 may directly obtain the disk subsystem configuration data by setting a communication path and the like from the host computer 10 to the disk subsystem SVP 43, 53 of the data centers 4 and 5, respectively.

Figure 11:
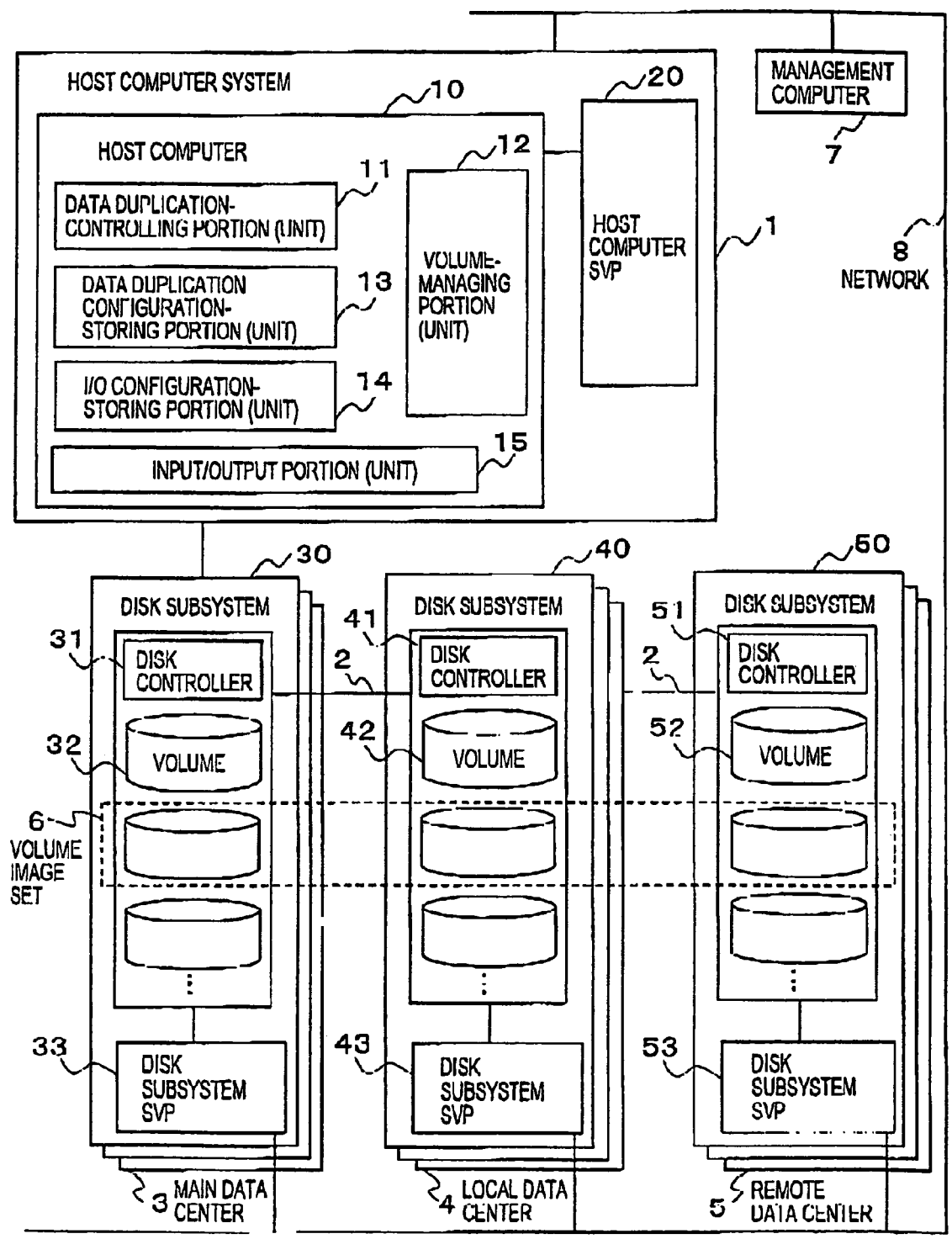
FIG. 11 is a schematic diagram showing a computer system to which provides a management computer.

Further in the computer system of the embodiment above, it is possible to configure such that a management computer for managing the overall computer system is provided, in addition to the host computer system 1. FIG. 11 is a schematic diagram showing a computer system to which provides a management computer.

For the management computer, a general-purpose computer system as shown in FIG. 2 can be used, and it is connected to the computer system of the above embodiment via the network. In this case, the management computer carries out a part of or all of the processes executed by the host computer system 1 of the above embodiment. For example, in the above embodiment, a user inputs the duplication condition data 18 from the input unit 904 of the host computer system 1. However, it is also possible to configure such that the user inputs the duplication condition data 18 from the input unit of the management computer. Then, the management computer notifies the host computer system 1 of the duplication condition data 18 thus inputted.

Furthermore, the management computer may carry out the data duplication processing as shown in FIG. 8, on behalf of the host computer system 1. In other words, the management computer obtains information (copy group definition data 16, disk subsystem configuration data 19 and the like) stored in the data duplication configuration-storing portion 13 of the host computer 1, via the network. Then, the management computer executes the data duplication processing based on the data stored in the data duplication configuration-storing portion 13, and transmits to the host computer system 1, the data of the data duplication configuration-storing portion 13 that has been updated by the processing. Then, the host computer system 1 receives the updated information of the data duplication configuration-storing portion 13, and transmits a command and the like, to the disk subsystems 30, 40, 50 and so on, to instruct a generation of a copy group in accordance with the contents of update.

Furthermore, it is also possible to configure such that the management computer may receive from a user a volume addition instruction against the volume-managing portion 12 of the host computer system 1. In this case, the management computer can detect an addition of volume in advance. Therefore, the management computer carries out the volume addition processing of the aforementioned data duplication processing (see FIG. 9), by use of the copy group definition data 16 and the like obtained from the host computer system 1. Then, the management computer transmits the result of the processing to the host computer 1 together with an instruction for volume addition. Accordingly, it is not necessary for the host computer 1 to search for a presence or non-presence of volume addition, and a processing in the entire system becomes simple.

Furthermore, the management computer may control the execution of starting or stopping operations by the data duplication-controlling portion 11 of the host computer system 1.

Figure 12:
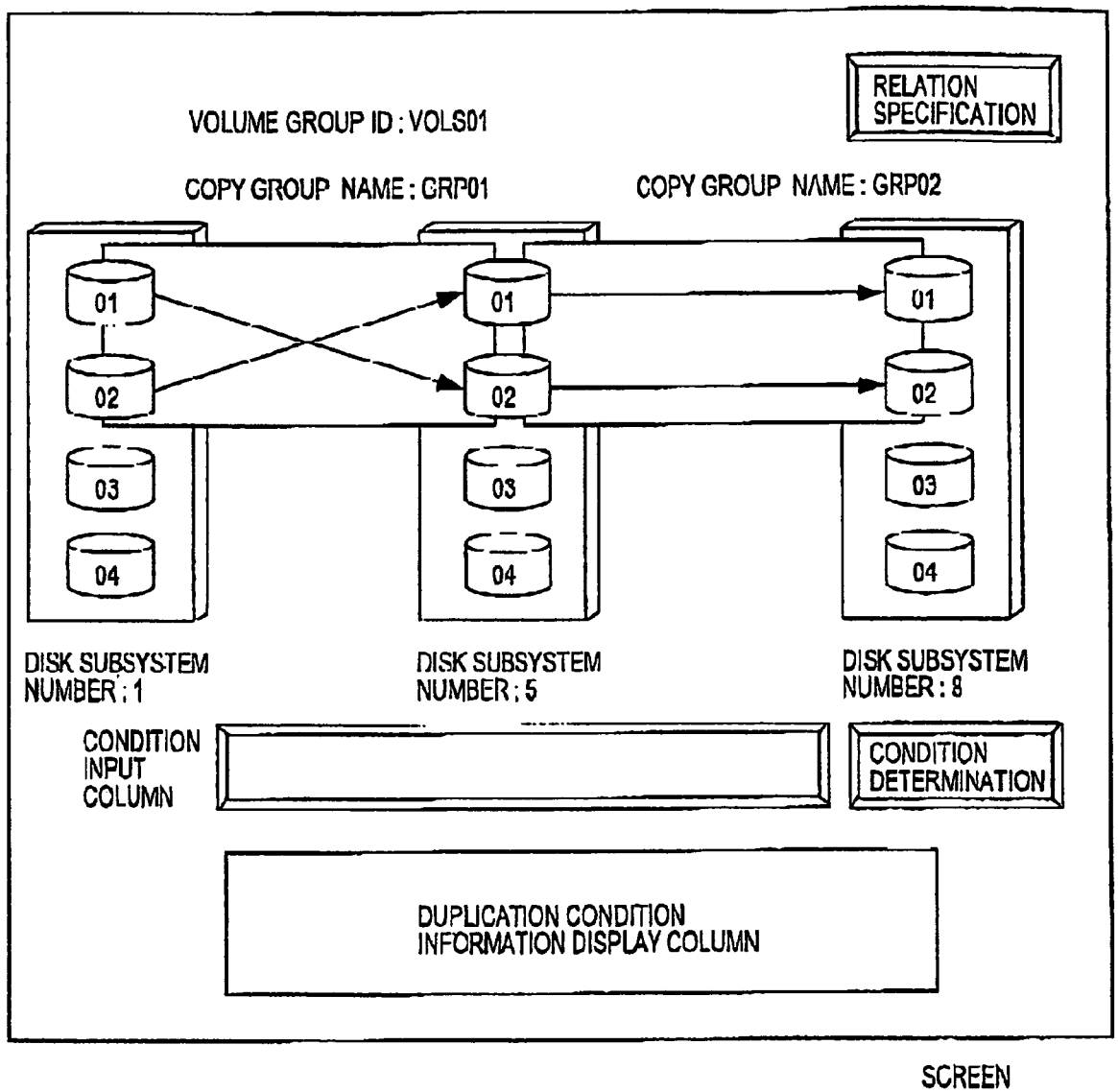
FIG. 12 is a diagram showing an example of GUI to which the host computer system 1 or the management computer has.

It is further possible for the host computer system 1 or the management computer to have a graphical user interface (GUI) to simplify data inputting by a user. FIG. 12 is a diagram showing an example of GUI to which the host computer system 1 or the management computer has. For example, this GUI displays on the output unit 905 the disc subsystems 30, 40 and 50 connected with the host computer system 1, following the connection topology. Then, the GUI receives a user instruction, creates information to generate a copy group in any of the instructed disk subsystems 30, 40, and 50, and makes an instruction to the data duplication-controlling portion 11. Furthermore, by use of the GUI, the copy group information between the disk subsystems may be visually displayed on the output unit 905. Accordingly, the user can select individual copy groups by way of the GUI interface, whereby it is easy to instruct the host computer system 1 to generate the volume image set 6.

What is claimed is:

1. A data duplication method which duplicates data being stored in a storage subsystem connected to a computer, wherein said computer includes a processor unit and a storing unit, and said storage subsystem includes a plurality of storage media managed as a plurality of volumes, said method comprising:
    a first storing step that causes said storing unit to store an identification information list indicative of identification information for identifying each of the plurality of volumes to be supplied to an application program which is processed by the computer,
    a second storing step that causes said storing unit to store a first duplication definition information which stores identification information indicative of a copy origin volume and identification information indicative of a copy destination volume,
    an identification information reading step which reads out from the storing unit the identification information list,
    a first reading step which reads out from the storing unit, a first duplication definition information,
    a first comparing step which compares the identification information list read out in the identification information reading step, and the first duplication definition information read out in the first reading step,
    an addition step in which when there exists first identification information that is stored in the identification information list but not stored in the first duplication definition information in the first comparing step, a copy destination volume of a volume identified by the first identification information is selected according to a predetermined selection condition, the first identification information and the identification information of the copy destination volume thus selected are added to the first duplication definition information, and data in the volume identified by the first identification information of the copy origin volume is copied to the copy destination volume thus selected, and
    a deletion step in which when there exists second identification information that is not stored in the identification information list but is stored in the first duplication definition information in the first comparing step, the second identification information and identification information of a copy destination volume, which is a copy destination of a volume identified by the second identification information, are deleted from the first duplication definition information, and copying the data of the volume identified by the second identification information is stopped.

2. The data duplication method according to claim 1, wherein,
    there exist a plurality of said storage subsystems connected to the computer, and a plurality of said storage subsystems which include said copy destination volume.

3. The data duplication method according to claim 1, further including:
    a second reading step which reads out from said storing unit, a second duplication definition information which stores identification information with respect to each of said plurality of volumes as a copy destination, and identification information of a volume as a further copy destination of each of said volumes,
    a second comparing step which compares the first duplication definition information read out in said first reading step, and the second duplication definition information read out in said second reading step, an addition step in which when there exists third identification information that is stored in the first duplication definition information but not stored in the second duplication definition information in the second comparing step, a further copy destination volume of a volume identified by the third identification information is selected according to a predetermined selection condition, the third identification information and identification information of the further copy destination volume thus selected are added to the second duplication definition information, and data in the volume identified by the third identification information is copied to the further copy destination volume thus selected, and a deletion step in which when there exists fourth identification information that is not stored in the first duplication definition information but is stored in the second duplication definition information in the second comparing step, the fourth identification information and identification information of a further copy destination volume, which is a further copy destination of a volume identified by the fourth identification information, are deleted from the second duplication definition information, and copying the data of the volume identified by the fourth identification information is stopped.

4. The data duplication method according to claim 1, wherein, said selection condition includes information which has caused an error to occur in said addition step.

5. A computer readable memory storing a computer program executable by a processor unit in a computer, for causing said computer to duplicate data being stored in a storage subsystem connected to the computer, wherein said computer includes the processor unit and a storing unit, and said storage subsystem includes a plurality of storage media managed as a plurality of volumes, said program being executed by the processor unit causing said processor unit to carry out steps comprising:

a first storing step that causes said storing unit to store therein an identification information list indicative of identification information for identifying each of the plurality of volumes to be supplied to an application program which is processed by the computer, a second storing step that causes said storing unit to store therein a first duplication definition information which stores identification information indicative of a copy origin volume and identification information indicative of a copy destination volume, an identification information reading step which reads out from the storing unit the identification information list, a definition information reading step which reads out from the storing unit, the first duplication definition information, a comparing step which compares the identification information list read out in the identification information reading step, and the first duplication definition information read out in the duplication definition reading step, an addition step in which when there exists first identification information that is stored in the identification information list but not stored in the first duplication definition information in the comparing step, a copy destination volume of a volume identified by the first identification information is selected according to a predetermined selection condition, the first identification information of the copy origin volume and the identification information of the copy destination volume thus selected are added to the first duplication definition information, and volume data identified by the first identification information of the copy origin is copied to the copy destination volume thus selected, and a deletion step in which when there exists second identification information that is not stored in the identification information list but is stored in the first duplication definition information in the comparing step, the second identification information and identification information of a volume, which is a copy destination of a volume identified by the second identification information, are deleted from the first duplication definition information, and copying the data of the volume identified by the second identification information is stopped.

6. A computer which duplicates data stored in a storage subsystem, comprising:

a first storing means which stores an identification information list in which identification information of each of a plurality of storage media included in said storage subsystem is stored, a second storing means which stores duplication definition information including identification information with respect to each of said plurality of volumes of a copy origin, and identification information of a copy destination volume of each of said volumes, and a comparing means which compares the identification information list stored in said first storing means, and the duplication definition information stored in said second storing means, wherein, when there exists first identification information that is stored in said identification information list but not stored in said duplication definition information, said comparing means selects, according to a predetermined selection condition, a copy destination volume of a volume identified by the first identification information, adds to said duplication definition information, the first identification information and the identification information of said copy destination volume thus selected, and copies data in the volume identified by the first identification information to said copy destination volume thus selected, and when there exists second identification information that is not stored in said identification information list, but stored in said duplication definition information, said comparing means deletes, from said duplication definition information, the second identification information and identification information of a copy destination volume, which is a copy destination of a volume identified by the second identification information, and stops copying of data in the volume identified by the second identification information.

7. A method of managing duplicating of data stored in a storage subsystem connected to a computer, wherein the storage subsystem includes a first disk subsystem and a second disk subsystem connected to the first disk subsystem, and the computer includes a processing unit and a storing unit, the management method comprising:

a first storing step which stores disk subsystem configuration information in the storing unit, the disk subsystem configuration information being used for managing a plurality of first volumes in the first disk subsystem supplied to an application operated on the computer as a virtual volume, a second storing step which stores copy definition information in the storing unit, the copy definition information indicating a correspondence between each of the first volumes and a corresponding second volume in the second disk subsystem, each second volume being a copy destination of data which is stored in at least one of the first volumes, a comparing step which compares the disk subsystem configuration information with the copy definition information, an addition step which adds information indicative of one the first volumes to the copy definition information, when information indicative of the one of the first volumes contained in the virtual volume is not contained in the copy definition information in the comparing step, and which adds information indicative of one of said second volumes to the copy definition information as a copy destination of the data which is to be stored in the one of first volumes to be added, a deletion step which deletes the copy definition information relating to one of the first volumes from the copy definition information, when information indicating that a volume which is different from the first volumes contained in the virtual volume is stored in the copy definition information in the comparing step.

8. The method according to claim 7, the first storing step further stores, as disk subsystem configuration information, information indicative of disk sub systems and information indicative of a volume configuration of each of the disk sub systems, wherein the adding step of adding the information indicative of the second volume to the copy definition information, further refers to the information indicative of the disk subsystem stored and information indicative of the volume configuration of the disk subsystem to determine whether there exists a candidate disk subsystem for a copy destination, and when there exists a candidate disk subsystem, further determines whether there exists in the candidate disk subsystem, a second volume that is not used yet and to which the one of the first volumes added to the copy definition information can be copied, and when there exists the second volume that can be copied, adds information indicative of the second volume to the copy definition information as a copy destination of the first volume which has been added to the copy definition information.

9. The method according to claim 8, further carrying out:

a third storing step in which when the first volume that is the copy origin for the duplicated data is copied to the second volume that is the copy destination and is further copied in a third volume that is a copy destination in a third disk system, group related definition information is stored in the storing unit, the group related definition information associating a first copy group information which is information indicative of correspondence between the first volume and the second volume with a second copy group information which is information indicative of correspondence between the second volume and the third volume;

a determination step which determines whether there exists a related copy group by referring to the copy group related information after the adding step; and a setting step in which when there exists a related copy group, information indicative of the second volume that is the copy destination of the first copy group is specified as a copy origin volume of the second copy group in the copy definition information.

10. The method according to claim 8, further carrying out a third storing step in which when the first volume that is the copy origin for the duplicated data, is copied in the second volume that is the copy destination and is further copied in a third volume that is a copy destination in a third disk system, group related definition information is stored in the storing unit, the group related definition information the associating a first copy group information which is information indicative of a correspondence between the first volume and the second volume with a second copy group information which is information indicative of a correspondence between the second volume and the third volume;

a determination step of determining whether there exists a copy group which relates to the deleted copy definition information by referring to the copy group related information after the deletion step; and a deletion step which deletes the second volume which is the copy destination volume of the first copy group and which is also a copy origin from the copy definition information, when there exists a related copy group in the copy group related information.

* * * * *